(12) United States Patent
Wang et al.

(10) Patent No.: US 6,412,381 B1
(45) Date of Patent: Jul. 2, 2002

(54) VENETIAN BLIND CUTTING MACHINE

(75) Inventors: Wei-Cheng Wang, Tai Nan Hsien; Ya-Wei Hsu, Hsin Chu, both of (TW)

(73) Assignees: Industrial Technology Research Institute, Hsinchu; Nien Made Enterprise Co., Ltd., Chang Hua Hsien, both of (TW)

( * ) Notice: Subject to any disclaimer, the term of this patent is extended or adjusted under 35 U.S.C. 154(b) by 0 days.

(21) Appl. No.: 09/493,614

(22) Filed: Jan. 28, 2000

(30) Foreign Application Priority Data

Dec. 16, 1999 (TW) ........................ 88221473 U

(51) Int. Cl.[7] .................... B23D 23/00; B26D 7/02
(52) U.S. Cl. .................. 83/454; 83/468.7; 83/478
(58) Field of Search .................. 83/454, 464, 467.1, 83/468, 468.7, 468.4, 397, 478, 485

(56) References Cited

U.S. PATENT DOCUMENTS

| | | | |
|---|---|---|---|
| 407,523 A | * 7/1889 | Greg | 83/464 |
| 844,746 A | * 2/1907 | Rice | 83/468 |
| 1,073,969 A | * 9/1913 | Dueysen | 83/468.7 |
| 2,485,274 A | * 10/1949 | Garrett | 83/468 |
| 2,662,563 A | * 12/1953 | Grove | 83/464 |
| 2,747,625 A | * 5/1956 | Small | 83/468 |
| 2,852,049 A | * 9/1958 | Peterson | 83/468.7 |
| 3,263,544 A | * 8/1966 | Margolien | 83/464 |
| 4,745,834 A | * 5/1988 | Neumann | 83/468 |
| 4,907,325 A | * 3/1990 | Hsu | 83/425.2 |
| 5,239,905 A | * 8/1993 | Dunn | 83/464 |
| 5,317,944 A | * 6/1994 | Hewitt | 83/478 |
| 5,456,149 A | * 10/1995 | Elesnheimer et al. | 83/564 |
| 5,743,161 A | * 4/1998 | Boudreau | 83/435.11 |
| 5,799,557 A | * 9/1998 | Wang | 83/468.7 |
| 5,927,172 A | * 7/1999 | Wang | 83/454 |
| 6,079,306 A | * 6/2000 | Liu | 83/454 |
| 6,142,196 A | * 11/2000 | Schumann et al. | 144/3.1 |
| 6,167,789 B1 | * 1/2001 | Daniels et al. | 83/451 |

* cited by examiner

Primary Examiner—Allan N. Shoap
Assistant Examiner—Stephen Choi
(74) Attorney, Agent, or Firm—Browdy and Neimark

(57) ABSTRACT

A Venetian blind cutting machine comprises a machine stand on which a cutting device and the clamping device are mounted. The cutting device has a blade which moves back and forth to execute the cutting of the Venetian blind. The pivoting center of the blade is higher than the position at which the Venetian blind is arranged. The lower half cutting edge of the blade provides the downward and the inward cutting forces to execute the cutting of the Venetian blind. The revolution rate and the feed rate of the blade are regulated by a controller in accordance with the nature of a material of which the Venetian blind is made.

12 Claims, 10 Drawing Sheets

VENETIAN BLIND CUTTING MACHINE

FIELD OF THE INVENTION

The present invention relates generally to a Venetian blind, and more particularly to a machine for cutting the Venetian blind.

BACKGROUND OF THE INVENTION

The Venetian blinds are generally made in quantity by the makers according to the standard specifications and are then shipped to the wholesale outlets for distribution. In other words, the Venetian blinds are not custom-made for the consumer. In view of the windows of the houses or buildings being of various specifications, the Venetian blinds must be cut to order to meet the demand of the consumer.

As shown in FIG. 1, a prior art hydaulic machine is manually operated to cut the Venetian blind according to the specifications demanded by a client. The manual operation is inefficient at best in light of the cutting of the Venetian blind being attained by the shear destruction. Such manual operation is feasible when the Venetian blind is made of an expandable material, such as aluminium. A smooth cutting surface of the Venetian blind can not be attained if the Venetian blind is made of tough material such as a wood or fiber containing material, or a rigid and fragile material such as PVC.

As shown in FIGS. 2 and 3, another prior art machine for cutting the Venetian blind is composed of a machine stand 1 on which a support frame 2 is mounted. The support frame 2 is provided at one end thereof with a clamping device 3 for holding a Venetian blind securely. The machine stand 1 is provided at the bottom thereof with a cutting device 4 capable of linear reciprocating motion and having a blade 4a which is partially exposed from the top of the machine stand 1 to facilitate the cutting of both ends of the Venetian blind. However, the blade 4a in motion has a machining force F, which brings about an outward push force Fa and a downward cutting force Fb, as shown in FIG. 4. The slats of the Venetian blind are apt to be pushed by the outward push force Fa, thereby causing the slats to be loosened. Under such a circumstance as described above, it is difficult to cut the Venetian blind such that the cut surface is smooth. In addition, the saw dust is caused by the machining force F to fall on the saw teeth of the blade 4a. As a result, the cutting efficiency of the blade 4a is seriously undermined. Moreover, the motor of the cutting machine is located under the blade 4a and is therefore vulnerable to malfunction which is caused by the accumulation of the saw dust around the axis of the motor.

SUMMARY OF THE INVENTION

The primary objective of the present invention is to provide a machine for cutting the Venetian blind in such a way that the structural integrity of the Venetian blind remains intact.

It is another objective of the present invention to provide a Venetian blind cutting machine with a blade whose rotational speed and feeding speed can be so controlled as to enable the blade to execute the smooth cutting of the Venetian blinds which are made of various materials.

It is still another objective of the present invention to provide a quiet machine for cutting the Venetian blind.

In keeping with the principle of the present invention, the foregoing objectives of the present invention are attained by a Venetian blind cutting machine comprising a machine stand on which a cutting device and a clamping device are mounted. The cutting device has a blade executing the cutting of the Venetian blind in a linear reciprocating manner along a cutting path. The Venetian blind is held securely by the clamping device such that one end of the Venetian blind is extended into the cutting path. The blade has a cutting side which is one quarter of a circle, and is formed by a cutting horizontal center line passing the pivotal center of the blade, and a cutting vertical center line. The cutting side is located at the lower half portion of the cutting horizontal center line such that a downward cutting force and an inward cutting force are brought about at the time when the Venetian blind is located at the cutting side of the blade and is being cut.

DETAILED DESCRIPTION OF THE INVENTION

Figure 1:
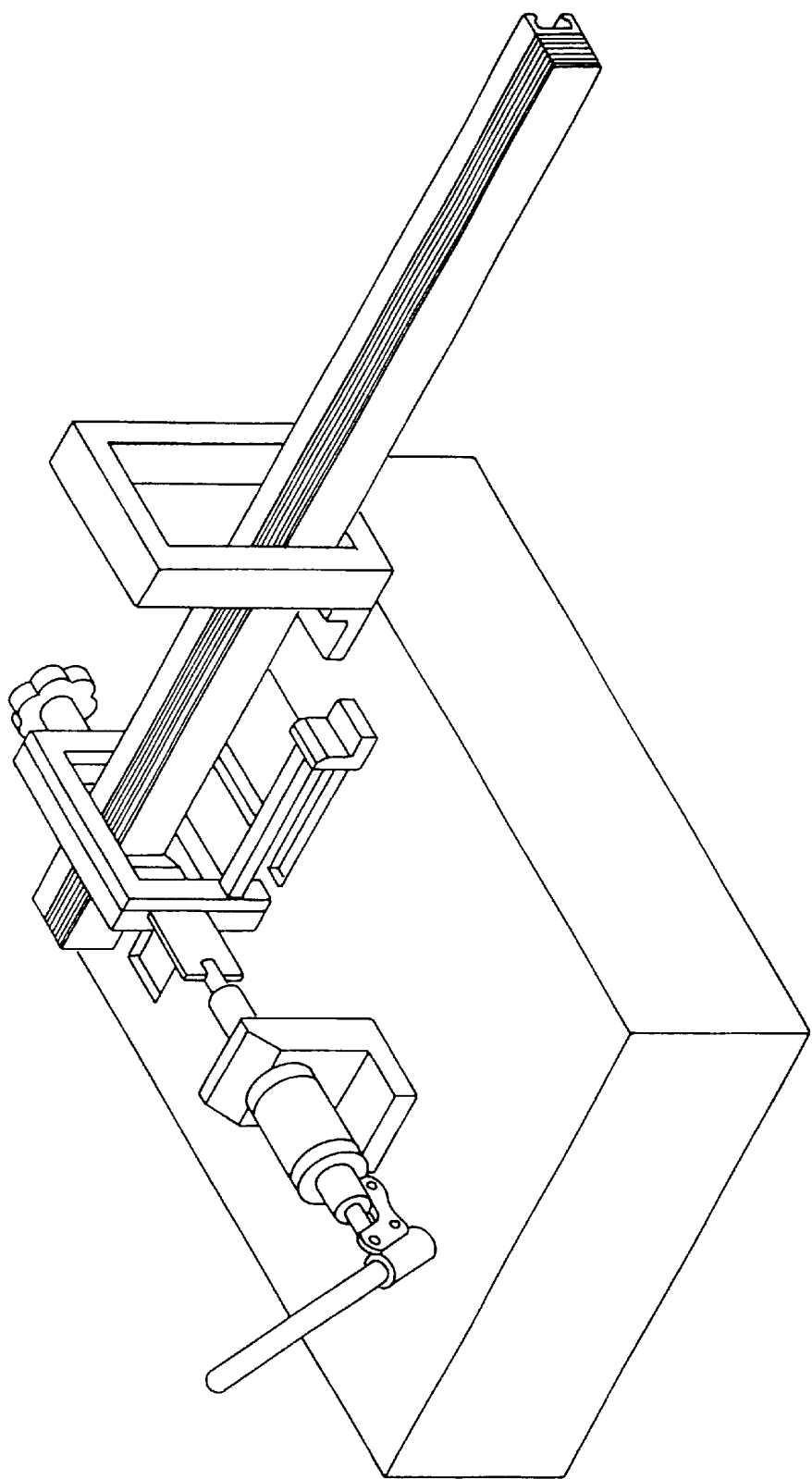
FIG. 1 shows a schematic view of the manual operation of a prior art machine for cutting the Venetian blind.
Figure 2:
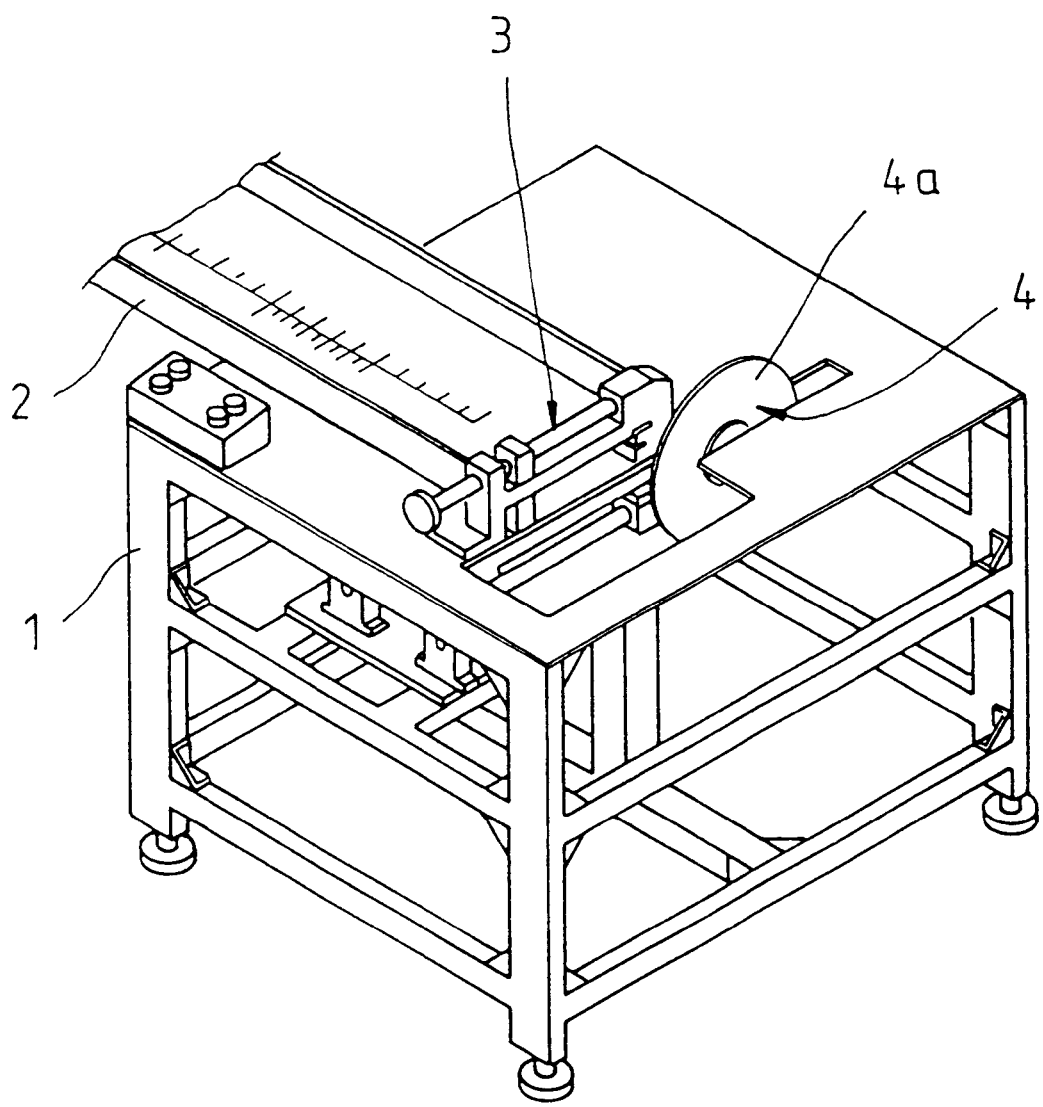
FIG. 2 shows a perspective view of another prior art machine for cutting the Venetian blind.
Figure 3:
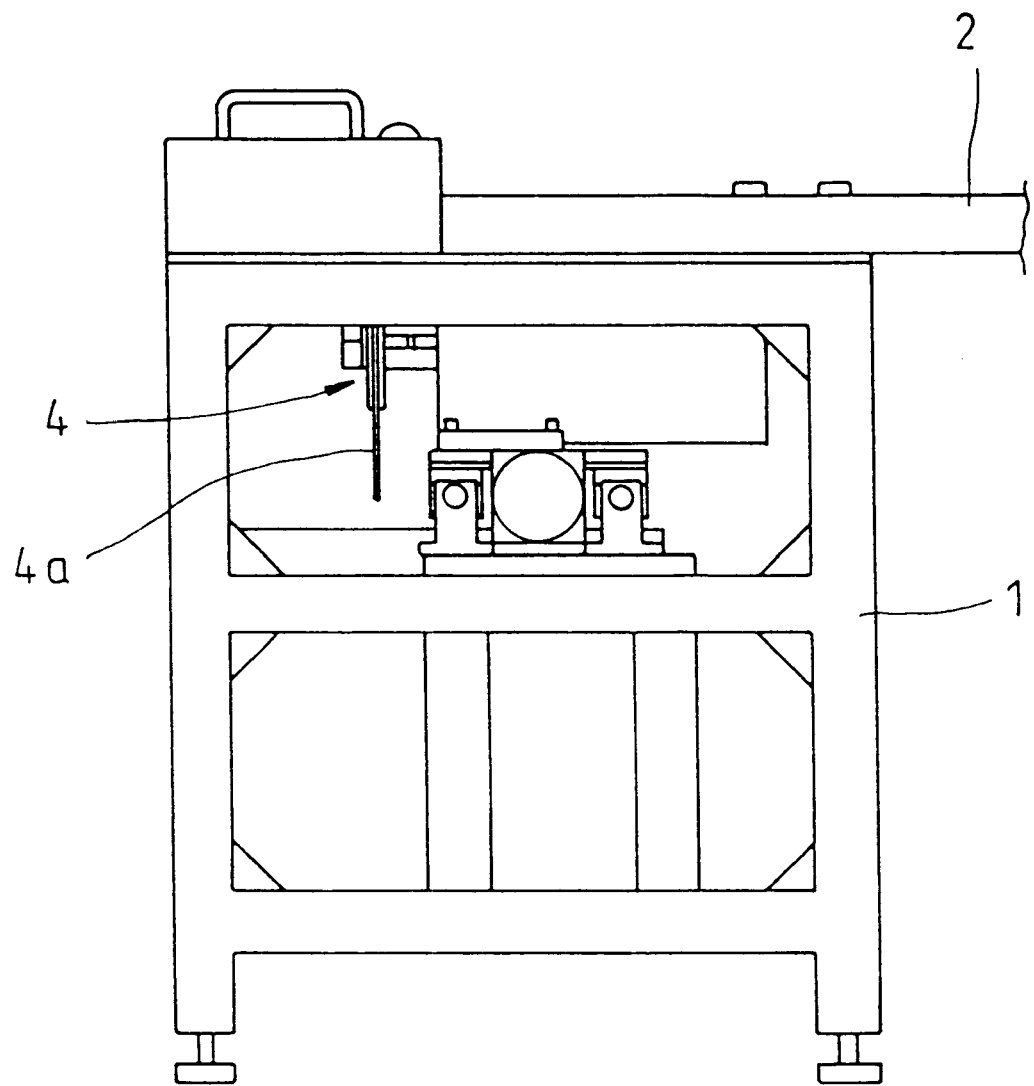
FIG. 3 shows a side view of the prior art machine as shown in FIG. 2.
Figure 4:
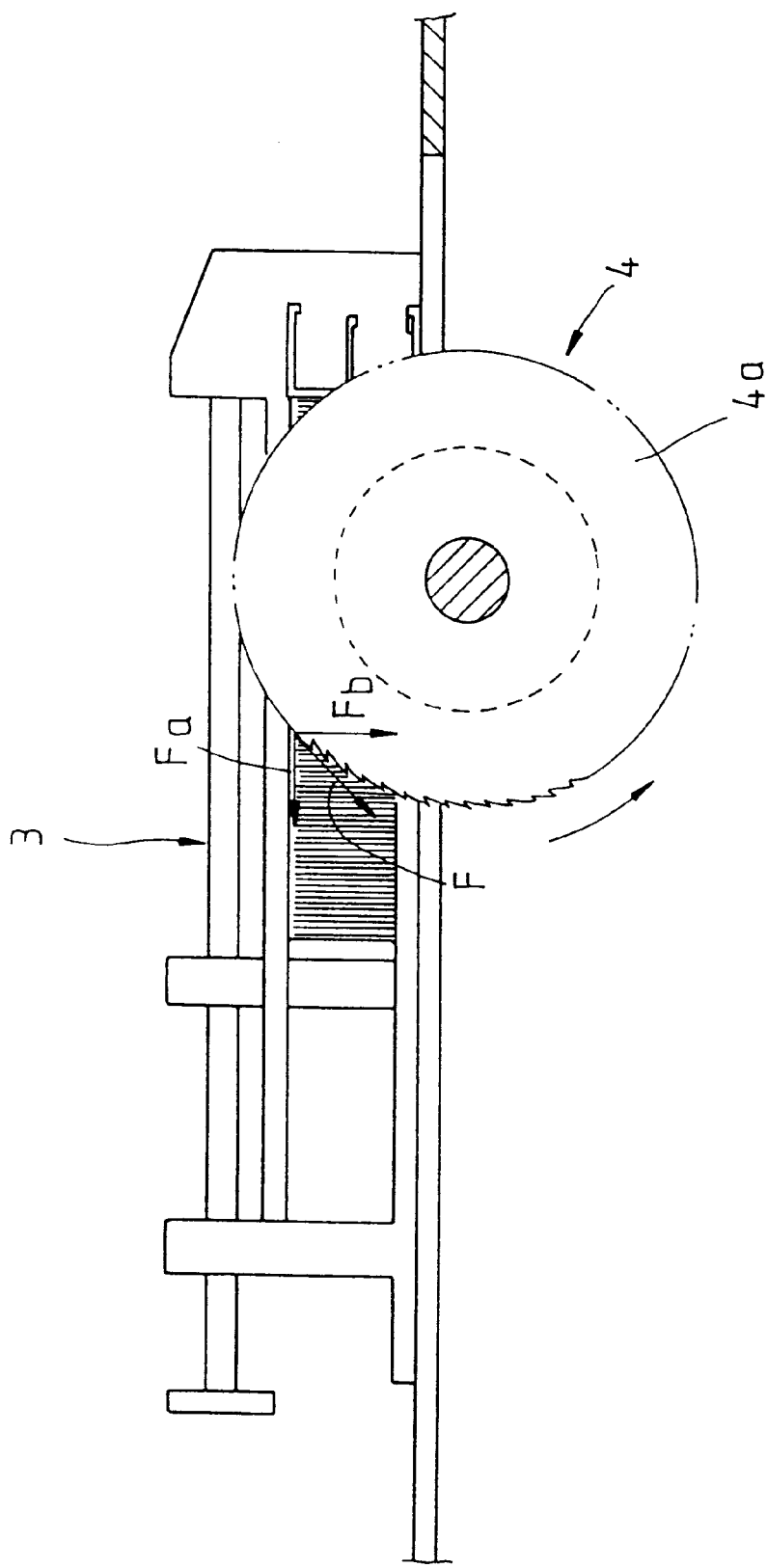
FIG. 4 shows a schematic view of the prior art machine at work to cut the Venetian blind.
Figure 5:
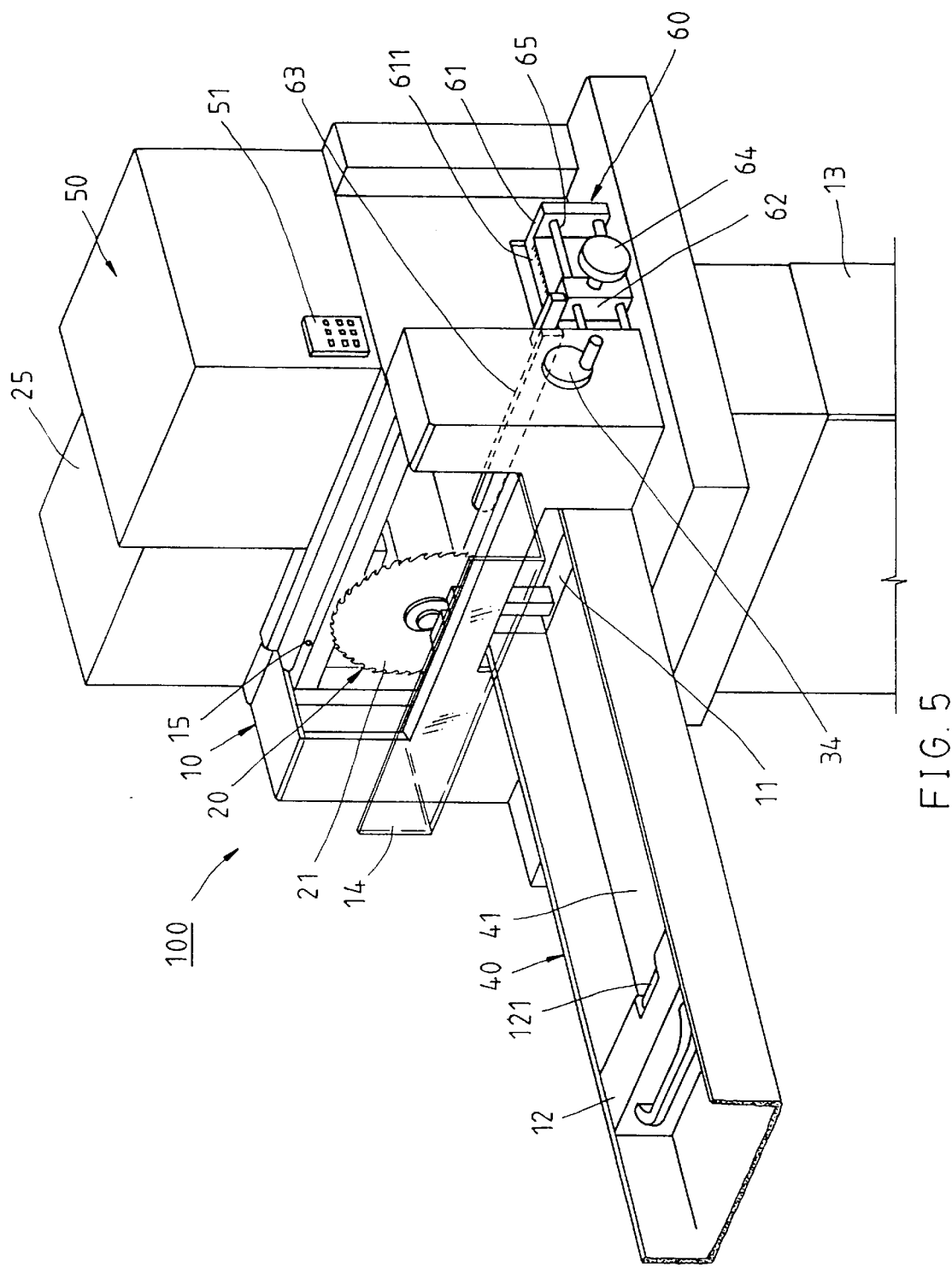
FIG. 5 shows a perspective view of a preferred embodiment of the present invention.
Figure 6:
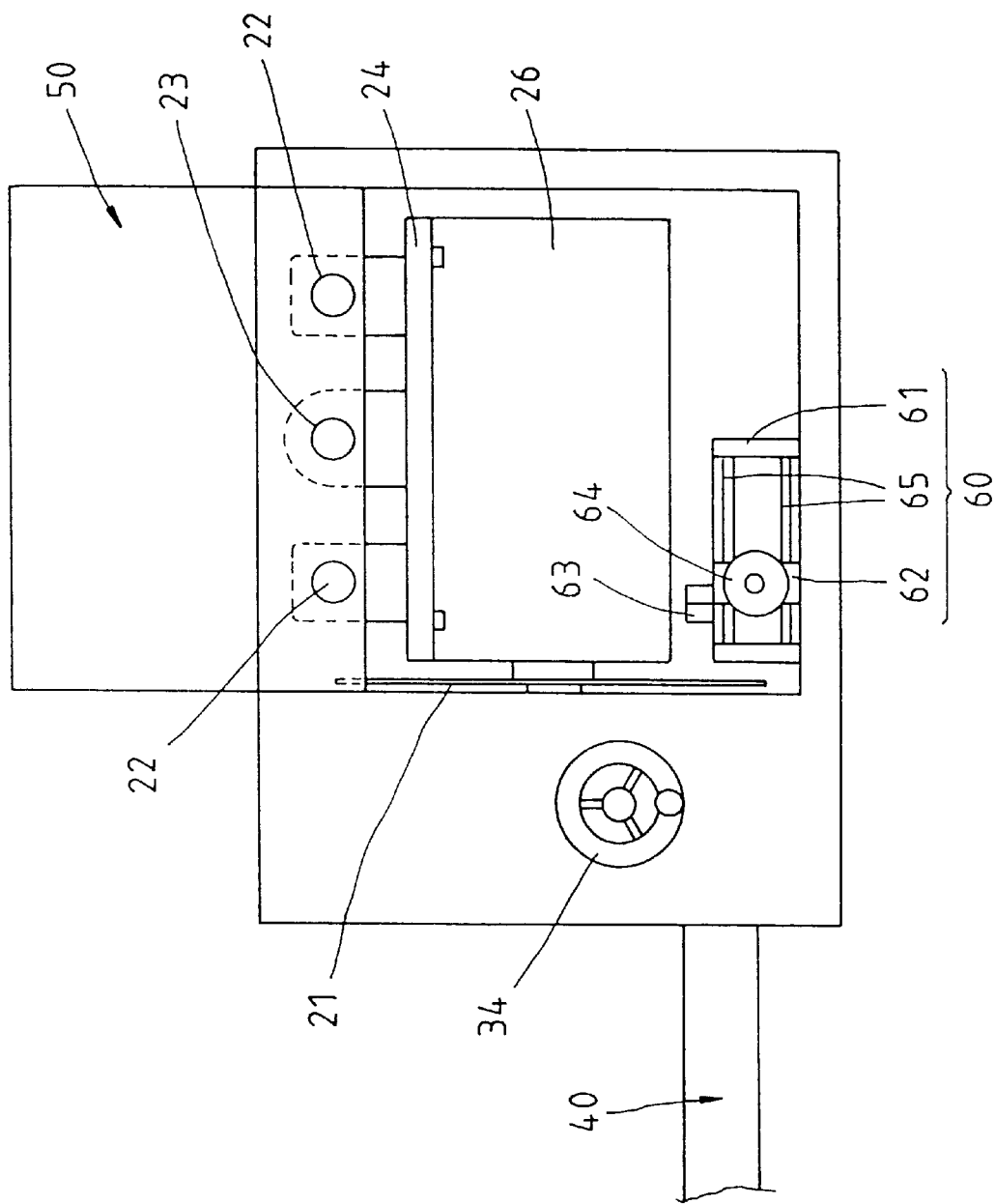
FIG. 6 shows a side view of the preferred embodiment of the present invention.
Figure 7:
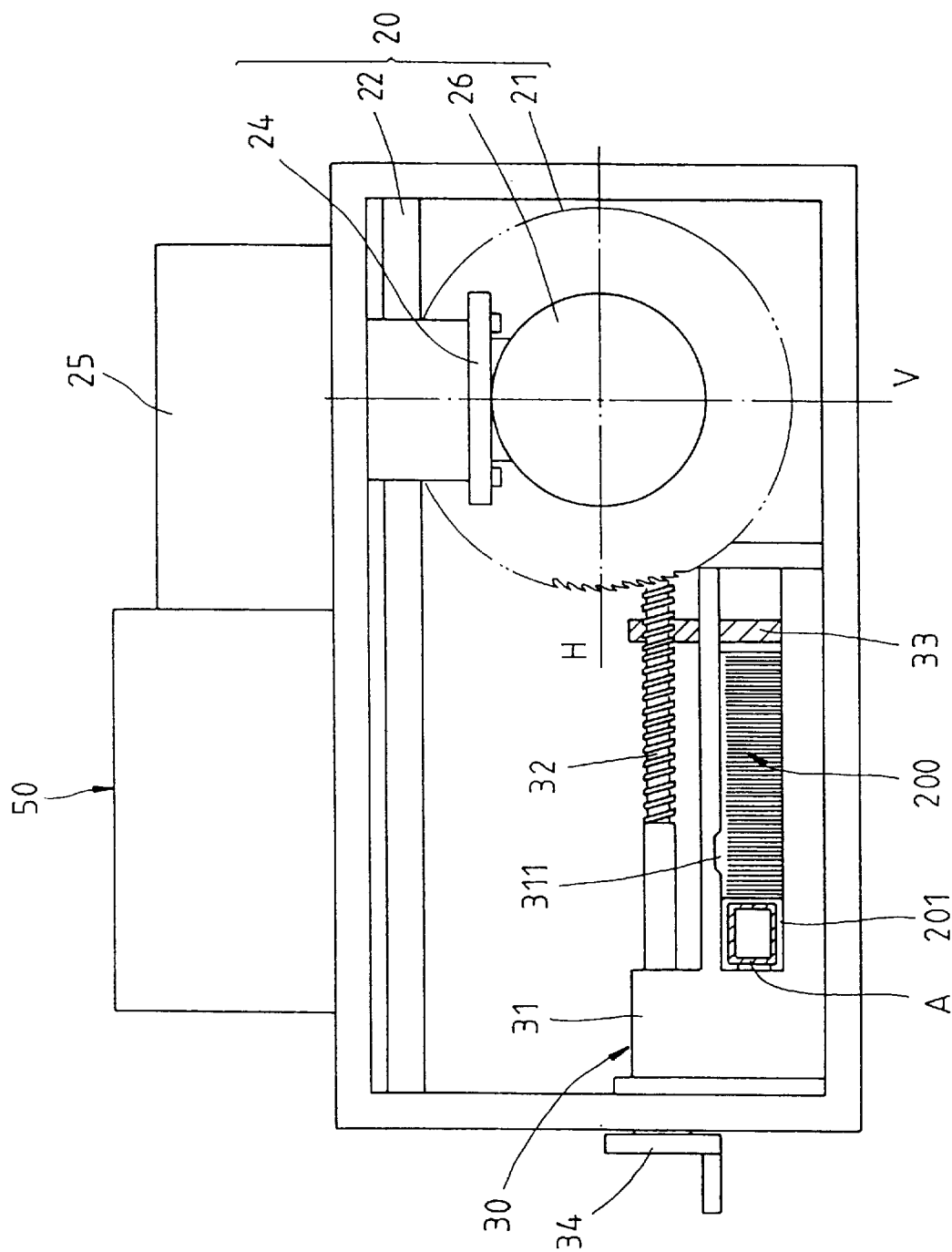
FIG. 7 shows a rear view of the preferred embodiment of the present invention.

As shown in FIGS. 5, 6, and 7, a Venetian blind cutting machine 100 embodied in the present invention comprises a machine stand or housing 10 on which a cutting device 20, a clamping device 30, and a blind supporting frame 40 are mounted.

The cutting device 20 has a blade 21 capable of a linear reciprocating motion along a cutting path to execute the cuffing of a Venetian blind 200 which is securely held by the clamping device 30 and is supported on the blind supporting frame 40.

The machine housing 10 is provided in the lower section of the front side thereof with a blind guiding port 11 at which the blind supporting frame 40 is connected. The blind supporting frame 40 has a U-shaped cross section and a slot 41 in which an urging member 12 is disposed such that the urging member 12 urges the side of the Venetian blind 200. The urging member 12 is provided in the upper edge thereof with a receiving slot 121. The machine housing 10 is provided at the bottom thereof with a collection device 13 for collecting the saw dust. The machine housing 10 is provided with a protective cover 14 fastened pivotally therewith such that the protective cover 14 is located over the guiding port 11, and that the protective over 14 can be lifted to facilitate the cleaning of the interior of the machine housing 10. The machine housing 10 is further provided with a safety switch 15 located at the place where the safety switch 15 is touched by the protective cover 14 at the time when the protective cover 14 is rotated from its open position shown in FIG. 5 to its closed position in FIG. 6. The preferred embodiment of the present invention is provided with a proximity switch. When the protective cover 14 is rotated to be closed, the safety switch 15 acts to bring about a predetermined effect.

As shown in FIG. 6, the cutting device 20 comprises two guide rods 22, a guide threaded rod 23, a slide seat 24, a transmission motor 25, and a drive motor 26. The transmission motor 25 and the drive motor 26 are controlled by a controller 50 mounted on the top of the machine stand 10.

The guide rods 22 are perpendicular to the feeding direction of the Venetian blind 200 and are mounted across the upper portion of the interior of the machine stand 10. The guide threaded rod 23 is disposed between the two guide rods 22 such that the guide threaded rod 23 is parallel to the guide rods 22.

The slide seat 24 is fitted with the two guide rods 22 and is driven by the guide threaded rod 23 to displace back and forth.

The transmission motor 25 is mounted on the top of the machine stand 10 to drive the guide threaded rod 23 to turn, so as to actuate the slide seat 24 to displace at a constant feed speed.

The drive motor 26 is mounted at the bottom of the slide seat 24. The spindle of the drive motor 26 is provided at one end thereof with a saw blade 21 fastened therewith for cutting the Venetian blind 200. The saw blade 21 has a cutting side which is one quarter of a circle formed by a cutting horizontal center line H passing the pivoting center of the saw blade 21, and a cutting vertical center line V. The cutting side is located at the lower half portion of the cutting horizontal center line H, so as to enable the saw blade 21 to execute the cutting of the Venetian blind 200 by the cutting side thereof. The drive motor 26 of the preferred embodiment of the present invention is a direct current motor capable of regulating the revolving speed of the saw blade 21 as the voltage is changed.

The clamping device 30 is mounted in the machined stand 10 and is contiguous to the guiding port 11. The clamping device 30 is formed of a clamping seat 31, a threaded rod 32, an adjustment block 33, and a rotary wheel 34. The clamping seat 31 has a U-shaped cross section and is connected with the blind supporting frame 40 for keeping the Venetian blind 200 to be cut. The adjustment block 33 is driven to displace by the threaded rod 32 via the rotary wheel 34 for holding the Venetian blind 200. The clamping seat 31 is provided with a frame slot 311 opposite in location to the receiving slot 121 of the urging member 12.

The machine stand 10 is provided in one side thereof with a measuring member 60 which is formed of a fastening seat 61, a slide block 62, an arresting plate 63, and a touch piece 64. The fastening block 61 is of an inverted U-shaped construction and is provided with two guide rods 65 disposed horizontally between the two side plates of the fastening block 61. The fastening seat 61 is further provided on the top thereof with a scale 611. The slide block 62 is capable of horizontal displacement along each guide rod 65. The arresting plate 63 is fastened with the slide block 62 for stopping the end edge of the Venetian blind 200. The touch piece 64 is movably fastened with the slide block 62 such that the touch piece 64 is turned to enable one end thereof to urge one side of the fastening seat 61 at the time when the slide block 62 is adjusted and located in accordance with the scale 611. As a result, the desired length of the Venetian blind 200 can be set with certainty.

In operation, the desired size of the Venetian blind 200 is first set by moving the slide block 62 under the direction of the scale 611 before the touch piece 64 is turned such that one end of the touch piece 64 urges the side of the fastening seat 61, thereby locating the arresting plate 63 at a position. Before the Venetian blind 200 is cut, the headrail 201 of the Venetian blind 200 is provided therein with a bracing tube A of a plastic material, which is intended to prevent the headrail 201 from being deformed by the cutting action. Thereafter, the Venetian blind 200 is placed on the slot 41 of the blind supporting frame 40 such that the Venetian blind 200 is pushed to move forward by the urging member 12. As soon as the front side of the Venetian blind 200 comes in contact with the arresting plate 63, the rotary wheel 34 turns to enable the adjustment block 33 to clamp the Venetian blind 200, which is then ready to be cut.

Figure 8:
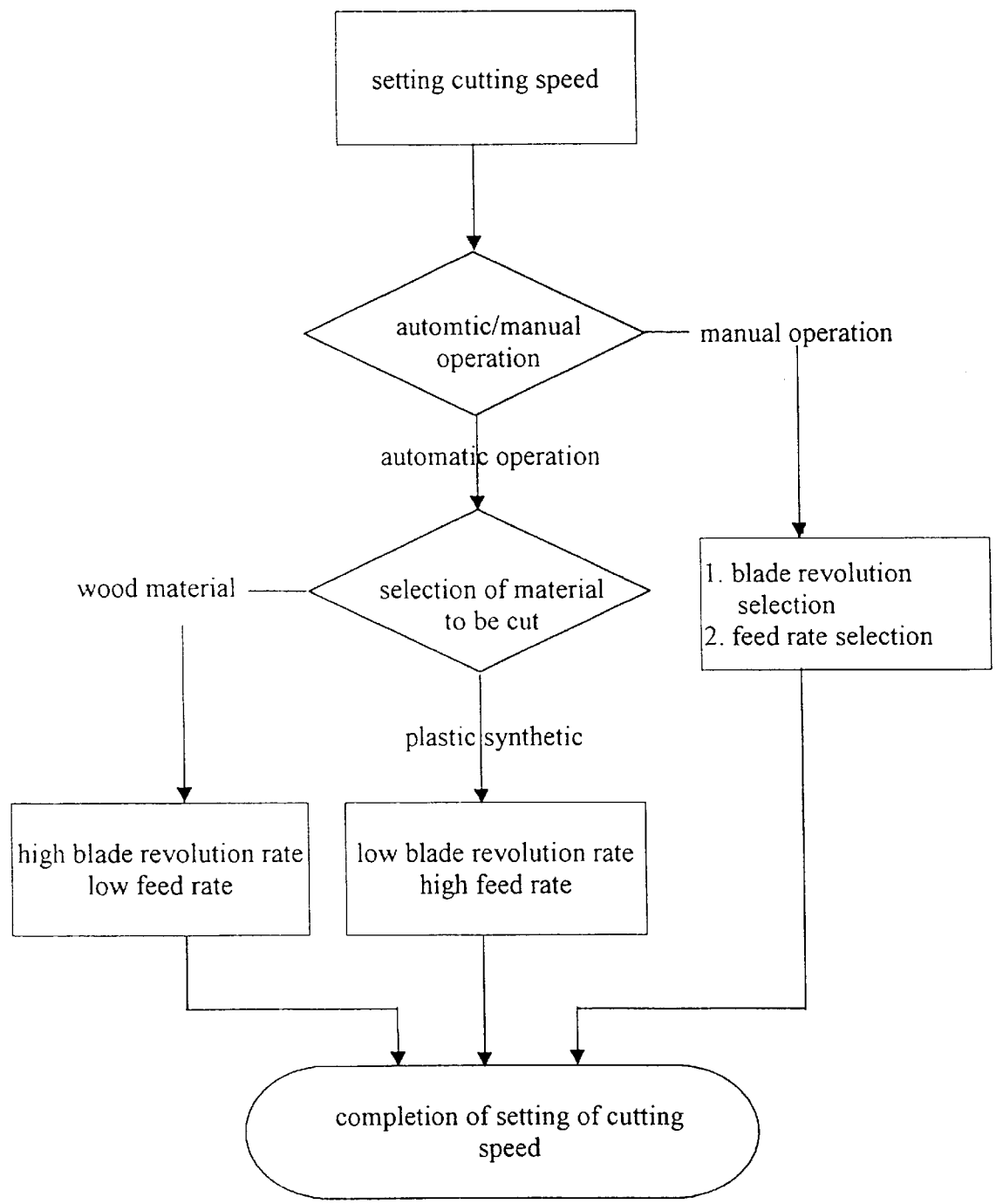
FIG. 8 shows a flow chart of the operation control of the blade by a controller of the preferred embodiment of the present invention.

As shown in FIG. 8, the cutting speed of the saw blade 21 is set manually or automatically by the controller 50. If the manual operation is chosen, the feed rate and the revolution per minute (RPM) of the saw blade 21 are regulated by controlling the transmission motor 25 and the drive motor 26. The execution of the cutting of the Venetian blind 200 is attained by the linear displacement of the saw blade 21 at the adjusted feed rate in conjunction with the adjusted revolution of the saw blade 21. The transmission motor 25 and the drive motor 26 can be automatically controlled by the controller 50. The controller 50 has a control seat 51 into which the appropriate reference data are entered before the transmission motor 25 and the drive motor 26 are started simultaneously to adjust the feed rate and the revolution of the saw blade 21 in accordance with the nature of the material of which the Venetian blind is made. For example, the Venetian blind 200 is made of a wood material or a material containing fibers, the revolution per minute (RPM) of the saw blade 21 must be faster, whereas the feed rate of the saw blade 21 must be slower. If the Venetian blind is made of a relatively fragile material, such as PVC, the revolution per minute of the saw blade 21 must be appropriately slowed down or kept constant, whereas the feed rate of the saw blade 21 must be appropriately faster.

Figure 9:
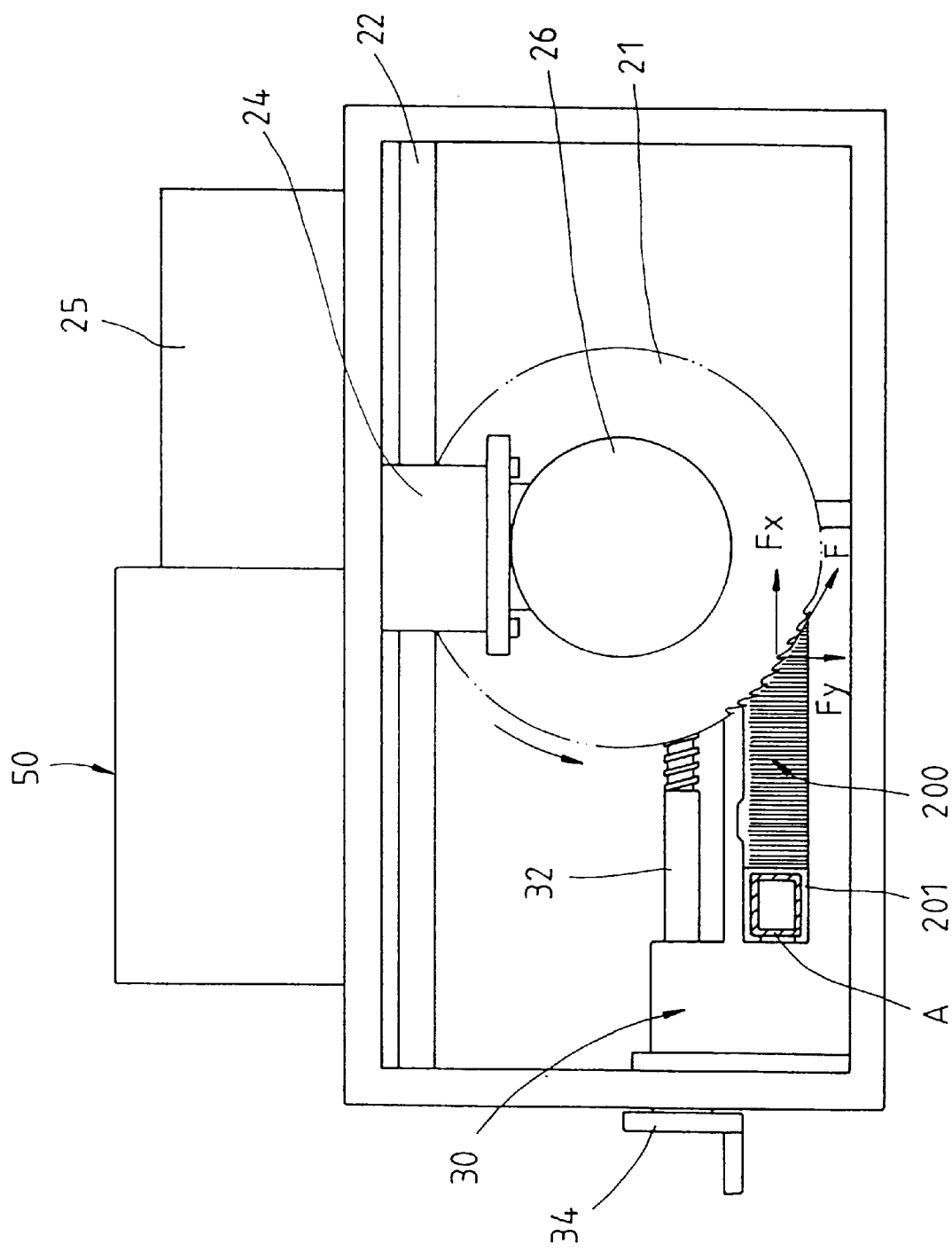
FIG. 9 shows a schematic view of the blade of the present invention in operation to execute the cutting of the Venetian blind.

As shown in FIG. 9, the drive motor 26, which regulates the revolution of the saw blade 21, is inverted to enable the arcuate cutting side of the front section of the lower half portion of the saw blade 21 to excute the cutting of the Venetian blind 200. The saw blade 21 has a cutting action force F, which brings about an inward cutting component of force Fx and a downward cutting component of force Fy. These two forces Fx and Fy bring about a downward pressure exerting on the slats of the Venetian blind 200 being cut, as well as the effect of pulling the slats together. As a result, the saw dust is allowed to fall into the collection device 13 in the downward tangent direction, thereby preventing the cut surfaces of the Venetian blind from being interfered by the saw dust. In addition, the operator of the machine of the present invention is provided with protection against the saw dust by the protective cover 14 which is made of a transparent material. In the event that the protective cover 14 is inadvertently lifted, the safety switch 15 is triggered to cut off the power supply to the controller 50, thereby resulting in the temporary interruption of the operation of the saw blade 21.

Before the cutting of the Venetian blind 200 is started, a decorative plate (not shown in the drawings) is arranged between the receiving slot 121 of the urging member 12 and the frame slot 311 of the clamping seat 31. The decorative plate is cut along the Venetian blind 200 for use in decorating the headrail 201 of the Venetian blind 200.

In order to enhance the collection of the saw dust, the machine stand 10 is provided with a suction device contiguous to the saw blade 21 for attaining a forcible collection of the saw dust.

Figure 10:
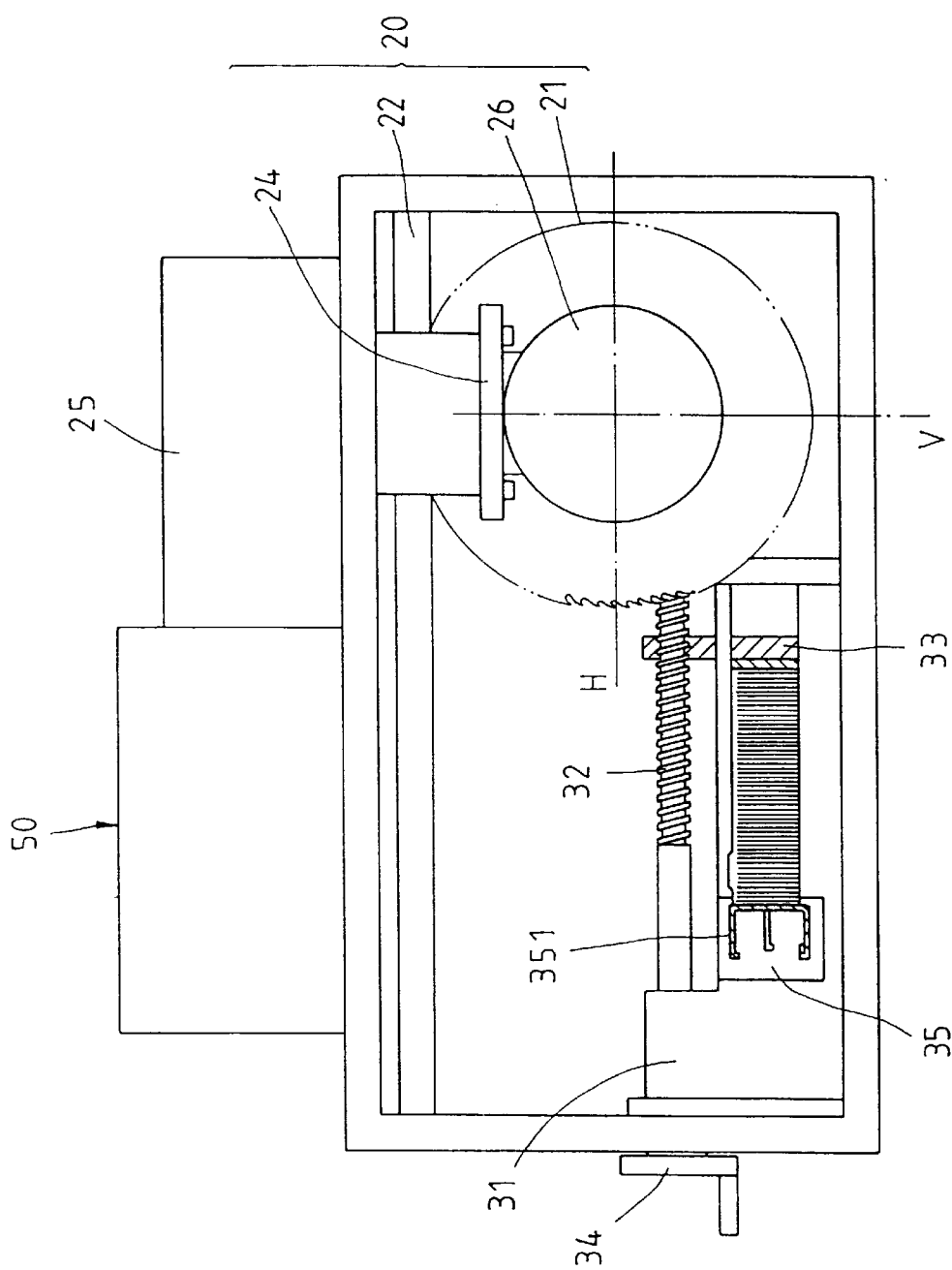
FIG. 10 shows a schematic view of the clamping device of another preferred embodiment of the present invention.

As shown in FIG. 10, the clamping device of another preferred embodiment of the present invention has a clamping seat 31 which is provided with a guide block 35 having a plurality of rail slots 351. The rail slots 351 are intended to guide the headrail 201 of the Venetian blind 200.

The saw dust produced in the operation of cutting the Venetian blind 200 by the machine of the present invention dose not interfere with the cut surfaces of the Venetian blind 200 in view of the fact that the cutting is done by the lower arcuate cutting side of the saw blade 21. In addition, the feed rate and the revolution speed of the saw blade 21 are regulated by the controller 50 in accordance with the nature of the material of which the Venetian blind is made. The drive motor 26 is a direct current motor, which is small in volume and relatively quiet while in operation. As a result, the saw blade 21 in operation is relatively quiet. The present invention may be used as a finishing tool to cut a wood or PVC material. The present invention is provided with a means to accommodate a decorative plate, which is cut along with the Venetian blind. It is therefore readily apparent that the present invention is versatile in design.

The embodiments of the present invention described above are to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A machine for cutting a Venetian blind comprising:
   a machine housing;
   a cutting device mounted in the machine housing;
   a blind supporting frame mounted on the machine housing for holding the Venetian blind;
   a clamping device mounted on the machine housing at a first end of the blind supporting frame for holding a first end of the Venetian blind in a cutting path of the cutting device;
   a circular blade on the cutting device driven in a linear reciprocating motion on guide rods which forms the cutting path;
   the guide rods being engaged on an upper side of the machine housing;
   said upper side of said machine housing comprising a front portion having a pivotable protective cover being disposed adjacent to the blade and parallel to the cutting path and side portions being disposed on each end of the cutting path and perpendicular to the front portion;
   wherein at least an upper half portion of the blade above an axis of rotation is entirely enclosed by said upper side of said machine housing when said protective cover is closed;
   wherein said axis of rotation through a center of the circular blade is spaced above and parallel to a longitudinal length of the Venetian blind to create a downward and inward cutting force on slats of the Venetian blind which pull the slats together when the Venetian blind is cut.

2. The machine according to claim 1, wherein the machine housing is provided on one side thereof with a Venetian blind guiding port;
   wherein the first end of said blind supporting frame abuts said guiding port;
   wherein said blind supporting frame is provided with a slot having a U-shaped cross-section, and
   an urging member disposed in said slot to urge a second end of a Venetian blind arranged on said blind supporting frame.

3. The machine according to claim 2, wherein the protective cover is pivotably engaged on the housing over the guiding port so as to permit movement between an open position and a closed position to facilitate cleaning an interior of the machine housing.

4. The machine according to claim 3, wherein the machine housing is provided with a safety switch,
   said safety switch being actuated by rotation of the protective cover to the closed position to switch off a controller to interrupt operation of the blade.

5. The machine according to claim 2, wherein said machine housing is provided with a measuring member, said measuring member formed of a fastening seat, a slide block, and an arresting plate, said fastening seat being provided on a top thereof with a scale, said arresting plate being fastened with said slide block to stop the first end of the Venetian blind, said slide block corresponding in location to said scale so as to adjust a cut length of the Venetian blind.

6. The machine according to claim 1, wherein said machine housing is provided at a bottom thereof with a saw dust collection device.

7. The machine according to claim 4, wherein said cutting device further comprises a drive motor for driving said blade, and a transmission motor for actuating said blade to displace, wherein said drive motor and said transmission motor are controlled by said controller.

8. The machine according to claim 4, wherein a revolution rate and a feed rate of said blade are regulated by the controller to facilitate cutting Venetian blinds made from different materials.

9. The machine according to claim 7, wherein said drive motor and transmission motor are direct current motors capable of regulating the revolution rate and the feed rate of said blade as voltage is changed.

10. The machine according to claim 1, wherein said blind supporting frame is provided with a bracing tube, wherein said bracing tube is inserted into the headrail of the Venetian blind for providing the headrail with protection against deformation.

11. The machine according to claim 2, wherein the urging member of the blind supporting frame is provided with a receiving slot;
   wherein said clamping device has a clamping set having a frame slot opposite in location to said receiving slot; and
   wherein said receiving slot and said frame slot are adapted to engage a decorative plate to be cut with the Venetian blind.

12. The machine according to claim 3, wherein said protective cover is transparent.

* * * * *